United States Patent
Nishikawa et al.

(10) Patent No.: US 8,371,034 B2
(45) Date of Patent: Feb. 12, 2013

(54) DUST COLLECTION COVER ATTACHABLE TO CUTTER

(75) Inventors: Tomomasa Nishikawa, Hitachinaka (JP); Shinki Ohtsu, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 579 days.

(21) Appl. No.: 11/994,142

(22) PCT Filed: Jun. 23, 2006

(86) PCT No.: PCT/JP2006/313040
§ 371 (c)(1),
(2), (4) Date: Dec. 28, 2007

(87) PCT Pub. No.: WO2007/004527
PCT Pub. Date: Jan. 11, 2007

(65) Prior Publication Data
US 2009/0114072 A1 May 7, 2009

(30) Foreign Application Priority Data

Jun. 30, 2005 (JP) .................................. 2005-190984
May 26, 2006 (JP) .................................. 2006-146783

(51) Int. Cl.
*B27B 21/00* (2006.01)
*B24B 55/06* (2006.01)
(52) U.S. Cl. .......................................... 30/516; 451/456
(58) Field of Classification Search .................... 30/516; 451/456
See application file for complete search history.

(56) References Cited

U.S. PATENT DOCUMENTS

| 5,167,215 | A | * | 12/1992 | Harding, Jr. ............... 125/13.01 |
| 5,537,748 | A | * | 7/1996 | Takahashi et al. ............. 30/124 |
| 5,890,292 | A | * | 4/1999 | Stark et al. ..................... 30/124 |
| 6,358,115 | B1 | | 3/2002 | Koike et al. |
| 6,546,631 | B2 | * | 4/2003 | Iida et al. ........................ 30/124 |
| 6,960,124 | B2 | | 11/2005 | Lee |
| 2001/0003983 | A1 | | 6/2001 | Iida et al. |

FOREIGN PATENT DOCUMENTS

| CN | 2584661 | 11/2003 |
| CN | 1496800 | 5/2004 |
| JP | 47-29893 | 12/1972 |
| JP | 50-156798 | 12/1975 |
| JP | 10-272622 | 10/1998 |
| JP | 11-179722 | 7/1999 |

(Continued)

OTHER PUBLICATIONS

Office Action issued in Japanese Patent Application No. 2006-146783 on Aug. 25, 2011.

*Primary Examiner* — Bryan R Muller
(74) *Attorney, Agent, or Firm* — Antonelli, Terry, Stout & Kraus, LLP.

(57) ABSTRACT

A dust collection cover capable of efficiently collecting cutting chips and residues generated as a result of cutting a workpiece. A cutter includes a motor and a rotary blade driven by the motor, and the dust collection cover is attached to the cover for covering a part of the blade. The cover is formed with a dust discharge port through which cutting chips and residues are discharged. The cover has a guide arrangement for directing the cutting chips and residues toward an interior of the cover body. The arrangement provides a blowing-out air blowing to the workpiece, or a rod-like member removing the cutting chips and residues.

10 Claims, 8 Drawing Sheets

FOREIGN PATENT DOCUMENTS

| | | | |
|---|---|---|---|
| JP | 11179722 A * | 7/1999 | |
| JP | 2001-162437 | 6/2001 | |
| JP | 2002-046018 | 2/2002 | |
| SU | 1349981 A1 | 11/1987 | |
| TW | 418453 | 1/2001 | |
| TW | 249797 | 11/2004 | |
| WO | WO 98/43794 | 10/1998 | |

* cited by examiner

FRONT ←→ REAR

COOLING AIR FLOW

DUST COLLECTION COVER ATTACHABLE TO CUTTER

TECHNICAL FIELD

The present invention relates to a dust collection cover attachable to a cutter for collecting cutting chips and residues.

BACKGROUND ART

Conventionally, as a cutter for cutting a concrete and a tile block, a disc grinder having a safety cover has been proposed for preventing dusts or cutting chips from being scattered. The disc grinder has a rotation shaft to which a circular blade is fixed. The safety cover is disposed over an outer peripheral edge of the circular blade. However, the dust or cutting chips may still be scattered even by the employment of the cover, to lower visibility and working environment in a working spot, particularly at an indoor working spot. Thus, the worker must wear a dust-protective mask and protective glasses.

In order to avoid this problem, Japanese Patent Application Publication No. 2002-46018 discloses a cutter in which one end of a dust collection hose is attached to a part of a cutter in fluid communication therewith. Another end of the dust collection hose is connected to an external electric dust collector. With this arrangement, residues and sawdusts generated during cutting operation are removed and collected into the duct collector through the hose. Alternatively, a dust collection bag can be used in combination with a vacuum device fluidly connected to the cover.

FIG. 14 shows a cutting state in a conventional cutter provided with a dust collection arrangement. A cutter 102 has a dust collection cover 101 in which a circular blade 104 is rotatably disposed. The cutter 102 cuts a workpiece 103 in a direction 109 while the circular blade 104 is rotated in a direction as indicated by an arrow in FIG. 14.

The dust collection cover 101 is attached with a suction sleeve 112 in fluid communication with an electric dust collector through a dust collection hose 120. A dust collection bag (not shown) is attachable to and detachable from the suction sleeve 112 so as to accumulate in the bag the dust discharged from the suction sleeve 112.

In the cutting operation for cutting the workpiece 103 with the cutter 102, the dust collection cover 101 and the cutter 102 are moved in the cutting direction 109. In this case, generated cutting dusts in the dust collection cover 101 are oriented toward the suction sleeve 112. The dusts are removed into the electric dust collector through the hose 120. Thus, scattering of the dust can be efficiently avoided.

However, since the dusts are directed in the cutting direction 109, a part of the protection cover 101 must be disposed at a leading end side thereof in the cutting direction. Accordingly, the leading end side of the protection cover 101 impedes a visibility to the blade edge.

In order to overcome this problem, another conventional cutter has been proposed as shown in FIG. 15 having a dust collection cover 201, a circular blade 204, and a suction sleeve 212. Cutting dusts are directed in a direction indicated by an arrow 205 which is opposite to a cutting direction indicated by an arrow 206. With this arrangement, it is unnecessary to largely cover a leading end side of the blade edge in the cutting direction 206, and therefore, the cutting edge at the leading end side can be observed.

Still however, the generated cutting dusts are not directed toward the suction sleeve 212, but are ejected into a cut groove 208 of the workpiece 203, thereby degrading dust collection efficiency.

It is therefore, an object of the present invention to provide a dust collection cover and a cutter provided with the same capable of enhancing dust collection efficiency without degrading visibility to the cutting edge.

DISCLOSURE OF INVENTION

The above and other objects of the present invention will be attained by a dust collection cover detachably assembled to a cutter provided with a motor and a rotary blade driven by the motor and partially covered by the cover. The dust collection cover has a cover body and a guide arrangement. The cover body is formed with a dust discharge port through which cutting chips and residues generated during a cutting operation are discharged. A dust collector is detachably connected to the discharge port. The guide arrangement is provided to the cover body for directing the cutting chips and residues toward an interior of the cover body.

The present invention further provides a cutter having a cutter body, a motor, a rotary blade, and a dust collection cover. The motor is disposed in the cutter body. The rotary blade is driven by the motor. The dust collection cover is detachably assembled to the cutter body and partially covering the rotary blade. The dust collection cover has a cover body and a guide arrangement. The cover body is formed with a dust discharge port through which cutting chips and residues generated through a cutting operation are discharged. A dust collector is detachably connected to the discharge port. The guide arrangement is provided to the cover body for directing the cutting chips and residues toward an interior of the cover body.

BEST MODE FOR CARRYING OUT THE INVENTION

A cutter having a dust collection cover according to a first embodiment of the present invention will be described with reference to FIGS. 1 through 8. It should be noted that identically labeled elements appearing in different ones of the figures refer to the same element in the different figures, but may not be referenced in the description for all figures. Further, the expressions "front", "rear", "above", and "below" are used throughout the description to define the various elements when the cutter is disposed in an orientation in which it is intended to be used.

Referring to FIGS. 1 through 4, a cutter 2 has a cutter body 21, a discoidal rotary blade 4 rotatably supported at a tip end of the cutter body 21, and a dust collection cover 1 for partially covering the rotary blade 4.

Figure 4:
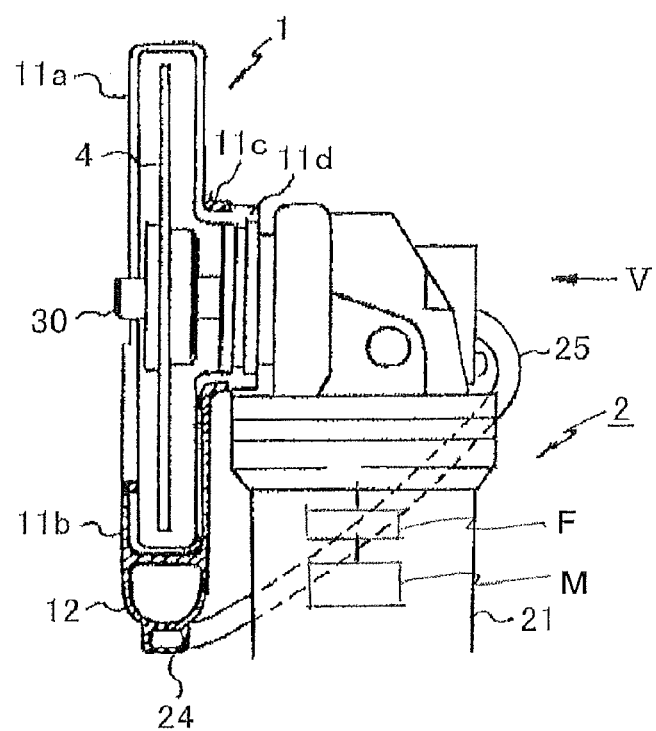
FIG. 4 is a cross-sectional view taken along the line IV-IV of FIG. 2.

Referring to FIG. 4, the cutter body 21 accommodates a motor, shown schematically at M in FIG. 4, as a power source to rotate a drive shaft 30. The drive shaft 30 extends laterally from a tip end of the cutter body 21. The rotary blade 4 is detachably coupled to the drive shaft 30 to be rotated by the motor.

The dust collection cover 1 is detachably assembled to the cutter body 21. The dust collection cover 1 has a stationary cover 11a and a movable cover 11b. The stationary cover 11a has a sleeve-like attaching portion 11d fitted around a cylindrical portion of the cutter body 21. Accordingly, the stationary cover 11a is detachably attached to the cutter body 21 through the attaching portion 11d. The movable cover 11b is supported to the stationary cover 11a from outside thereof.

As shown in FIG. 4, the cylindrical portion is disposed over the output shaft 30. The movable cover 11b has a cylindrical attaching portion 11c pivotably movably fitted around the cylindrical attaching portion 11d of the stationary cover 11a. Thus, the movable cover 11b is angularly movable along an outer peripheral surface of the stationary cover 11a.

Figure 6:
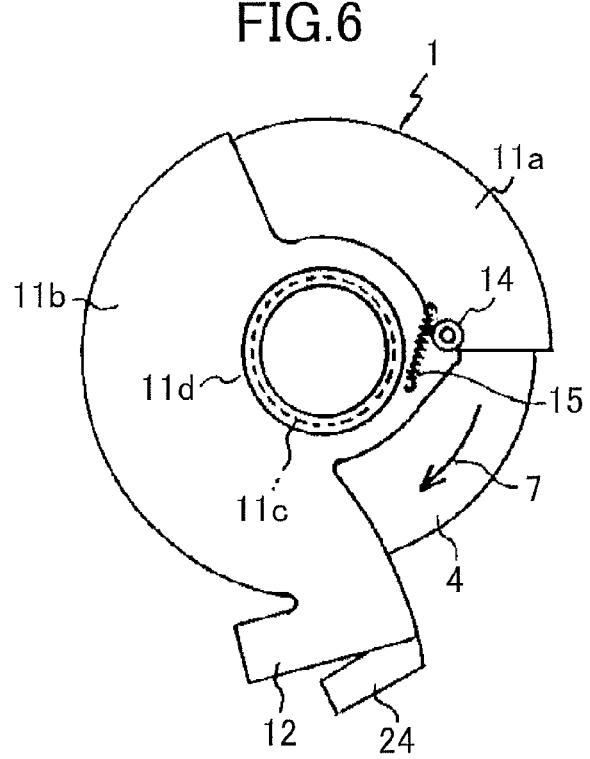
FIG. 6 is a rear view of the cutter as viewed in a direction indicated by an arrow VI in FIG. 1.

As described above, the movable cover 11b is pivotable about the attaching portion 11d of the stationary cover 11a. As shown in FIG. 6, a spring 15 is hooked between the movable cover 11b and the stationary cover 11a to urge the movable cover 11b in a counterclockwise direction in FIG. 6 (a reverse direction to a rotating direction 7 of the rotary blade 4). A stopper 14 is provided on the stationary cover 11a to regulate the movement of the movable cover 11b upon abutment with the stopper 14.

Referring to FIGS. 1 and 2 again, a drain cylinder portion 12 is provided integrally with the movable cover 11b at one end thereof to remove cutting chips and residues which has been generated from a workpiece 3 by the rotating rotary blade 4 to outside of the dust collection cover 1. It is noted that the "one end" of the movable cover 11b means the end in a flowing direction 26 of the cutting chips and dusts which have been generated from the workpiece 3 by the rotary blade 4 shown in FIG. 2. An air ejection cylinder portion 24 is provided integrally with the movable cover 11b in proximity to the drain cylinder portion 12. The drain cylinder portion 12 is provided between the rotary blade 4 and the air ejection cylinder portion 24 in a radial direction of the rotary blade 4. In this embodiment, "cutting chips and residues" include sawdust, cutting chips, particles of concrete and ceramics, and residues which are generated as a result of cutting a workpiece.

Figure 1:
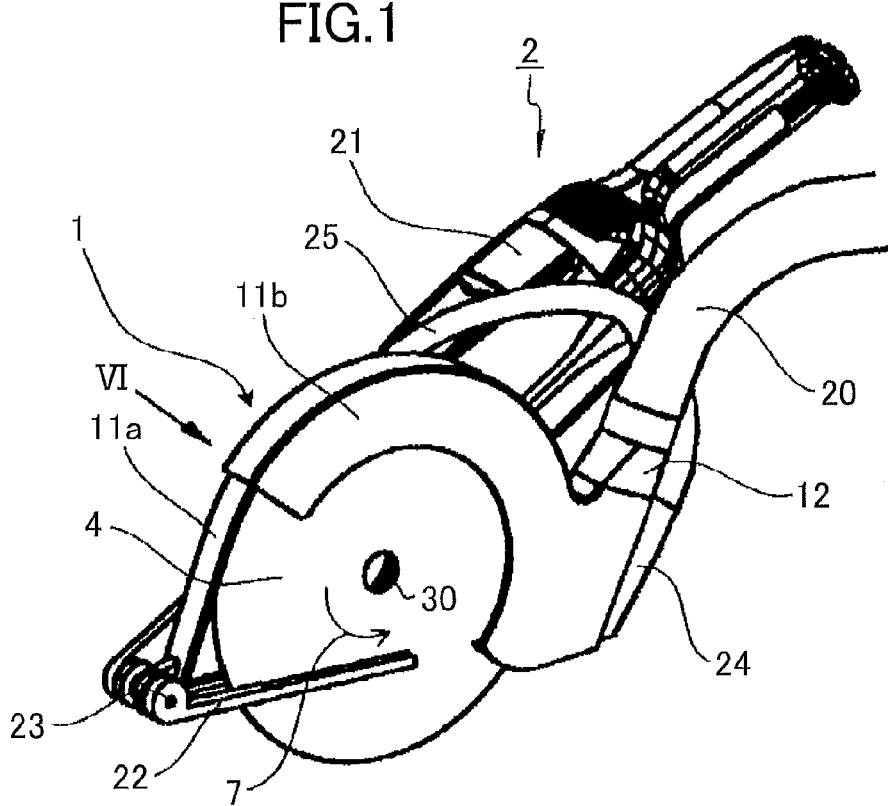
FIG. 1 is a perspective view of a cutter provided with a dust collection cover according to a first embodiment of the present invention.
Figure 2:
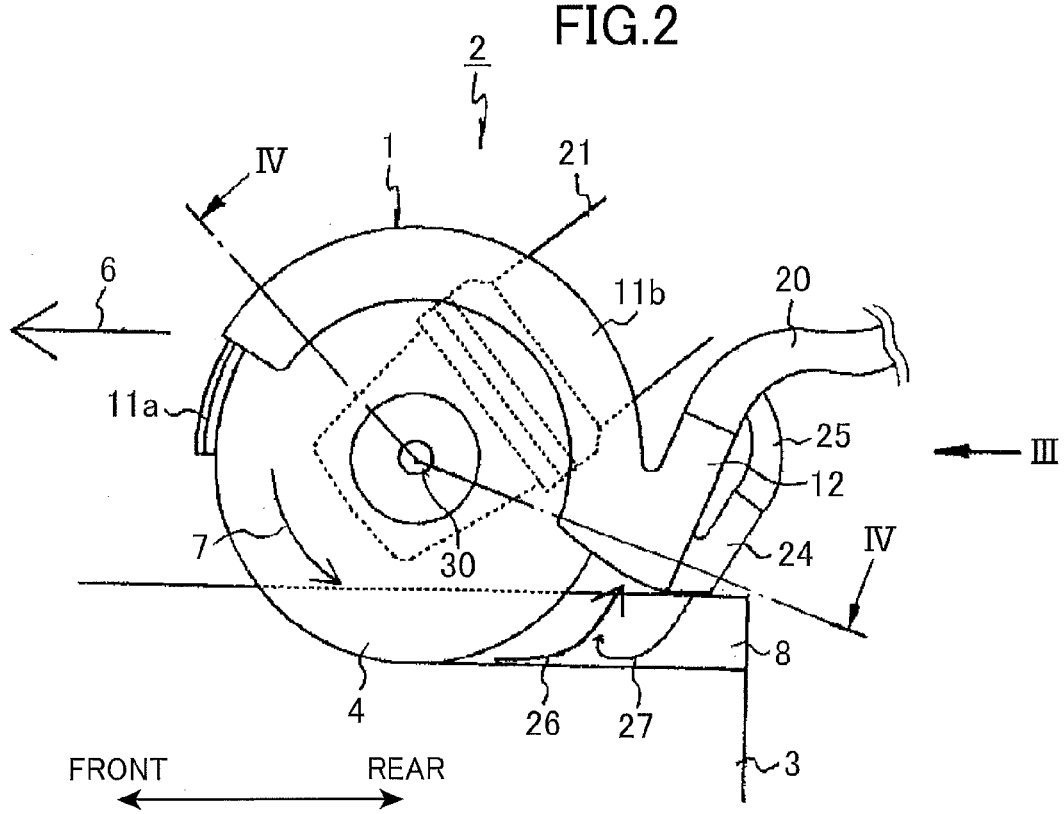
FIG. 2 is a front view for description of cutting operation with the cutter according to the first embodiment.
Figure 3:
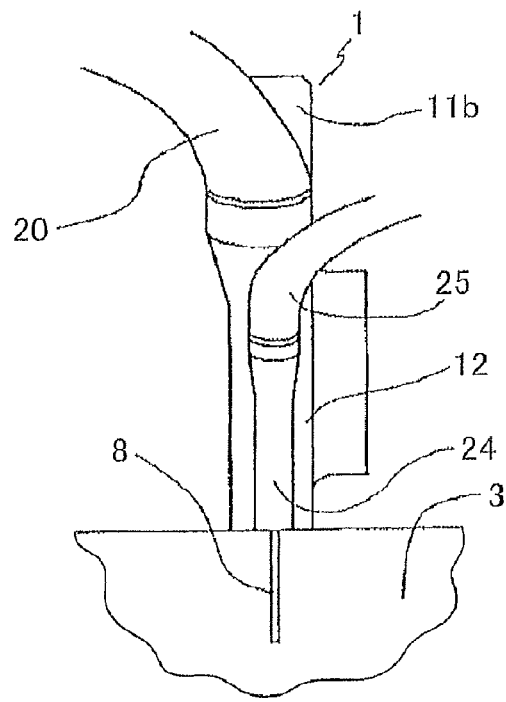
FIG. 3 is a view of the cutter according to the first embodiment as viewed in a direction indicated by an arrow III of FIG. 2.
Figure 5:
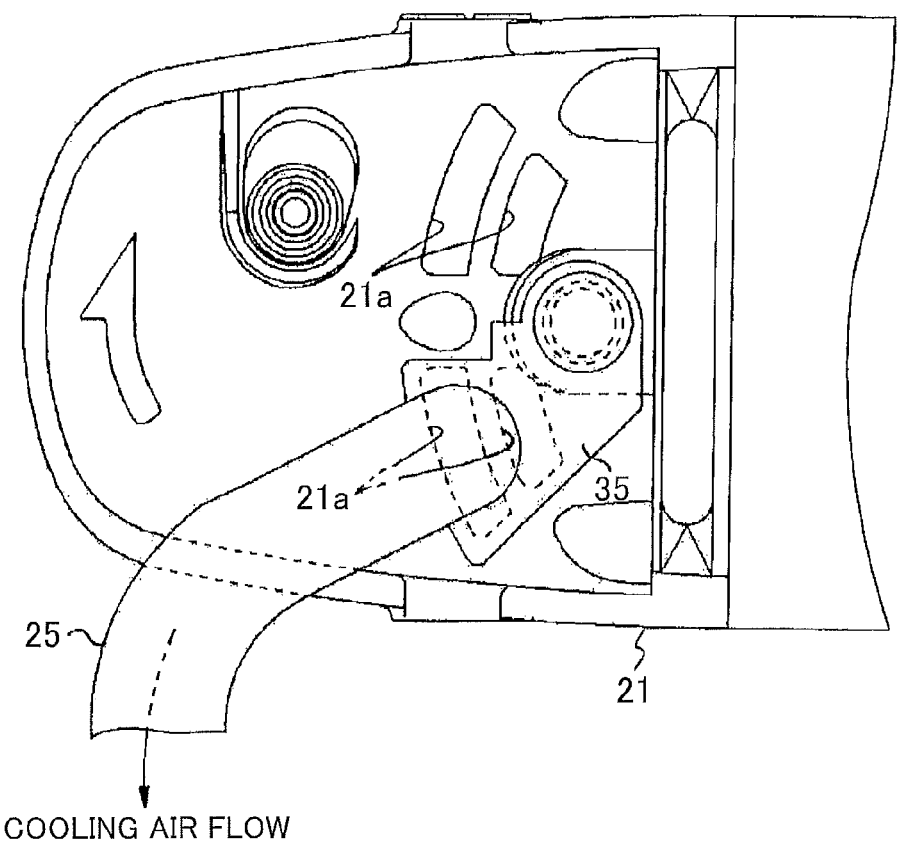
FIG. 5 is an enlarged view as viewed in a direction indicated by an arrow V of FIG. 4.

As shown in FIGS. 1 to 3, the air ejection cylinder portion 24 is connected to one end of an air ejection hose 25. As shown in FIG. 5, the other end of the air ejection hose 25 is connected to an outlet side of a cooling fan, shown schematically at F in FIG. 4, to cool the motor in the cutter body 21.

As shown in FIG. 5, the cutter body 21 has a plurality of outlet ports 21a for discharging cooling air generated by the cooling fan therethrough. An attachment member 35 is attached to the other end of the air ejection hose 25. The attachment member 35 is detachably attached to the cutter body 21 so that the other end of the air ejection hose 25 can be detachably attached to the cutter body 21 by a single-step operation. The attachment member 35 is attached to the cutter body 21 so as to cover some of the outlet ports 21a provided in the cutter body 21. In this embodiment, two outlet ports are covered with the attachment member 35. A part of the cooling air flow which has been generated by the cooling fan (not shown) is discharged through the two outlet ports 21a to the air ejection hose 25, and then sprayed to the workpiece 3 through the air ejection cylinder portion 24. Remaining cooling air is discharged to an atmosphere through the other outlet ports 21a.

Figure 8:
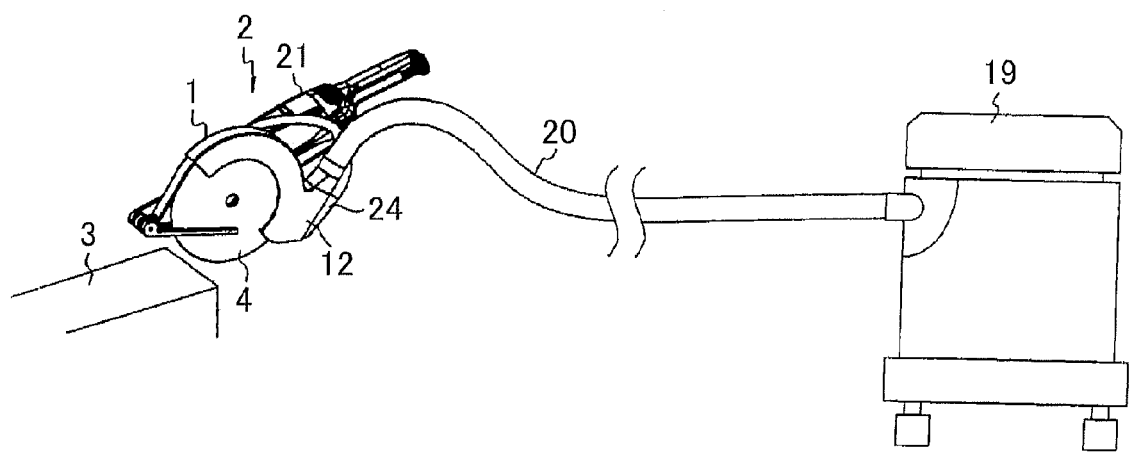
FIG. 8 is a perspective view showing a fluid connection between the cutter according to the first embodiment and a dust collector.

Referring to FIG. 8, the cutter 2 is configured to be connected to the dust collector 19 through a dust collection hose 20 extending therefrom, when the cutter 2 cuts the workpiece 3. The dust collection hose 20 is in fluid communication with the drain cylinder portion 12 formed in the movable cover 11b. Accordingly, the dust collection cover 1 is in fluid communication with the dust collector 19 through the dust collection hose 20 during a cutting operation. Alternatively, a duct collection bag (not shown) contained in the dust collector 19 may be connected directly to the drain cylinder portion 12.

Figure 7:
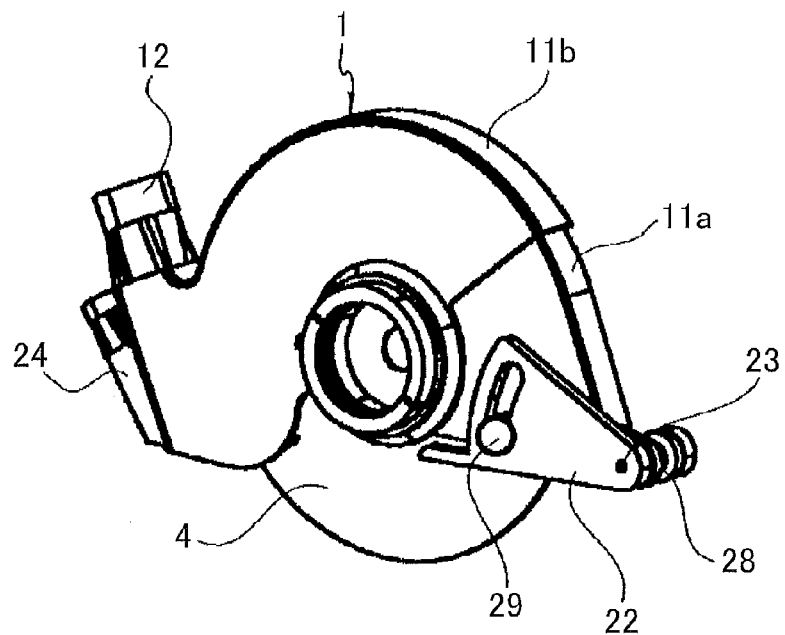
FIG. 7 is a perspective view particularly showing a dust collection cover according to the first embodiment.

Referring to FIGS. 1 and 7, a base member 22 is pivotably supported by a shaft 23 on the other end of the stationary cover 11a (on the opposite side to the drain cylinder portion 12). The base member 22 is pivotable about the shaft 23. An angular position of the base member 22 with respect to the stationary cover 11a is adjusted by a knob 29 shown in FIG. 7. The angular adjustment of the base member 22 with respect to the stationary cover 11a determines a depth of a groove formed in the workpiece 3 by the cutter 2.

A guide roller 28 is rotatably supported to a tip end of the base member 22 near the shaft 23. The rotation of the guide roller 28 on the workpiece 3 leads to a smooth movement of the cutter 2 in a cutting direction 6. It is noted that the base member 22 is not shown in FIGS. 2, 3, and 6.

The next description will be made for explaining a cutting operation to cut the workpiece 3 by the cutter 2 having the above structure.

As shown in FIG. 8, the dust collection hose 20 of the dust collector 19 is connected to the cutter 2 for the cutting operation. In other words, the dust collection hose 20 is in fluid communication with the drain cylinder portion 12 of the movable cover 11b, so that the dust collection cover 1 is also in fluid communication with the dust collector 19 through the dust collection hose 20.

Under the above structure, the rotary blade 4 is then driven by the motor to rotate in a rotating direction indicated by an arrow 7 in FIG. 2 (counterclockwise direction in FIG. 2).

Simultaneously, the dust collector 19 is driven to generate a negative pressure force. Then, the cutter 2 is moved on the workpiece 3 in a direction indicated by an arrow 6 (leftward in FIG. 2). Accordingly, the rotary blade 4 cuts the workpiece 3 to form a groove 8 in the workpiece 3 in a moving direction of the cutter 2. At this time, the drain cylinder portion 12 and the air ejection cylinder portion 24 of the movable cover 11b open to the workpiece 3 on the rear side of the rotary blade 4. It is noted that the cutting direction 6 is directed ahead of a front side of the cutter 2.

Cutting chips and dusts generated by cutting the workpiece 3 are moved within the groove 8 in the flowing direction 26 shown in FIG. 2 due to the rotary blade 4 rotating in a rotating direction shown by an arrow 7. Simultaneously, part of a cooling air-flow discharged from the cooling fan (not shown) is passed from the outlet port 21a shown in FIG. 5 through the attachment member 35 and the air ejection hose 25 to the air ejection cylinder portion 24, and then discharged from the air ejection cylinder portion 24 into the groove 8 in the workpiece 3 in an ejecting direction indicated by an arrow 27. In other words, the cooling air flow is ejected downward from the dust collection cover 1 to the workpiece 3, and enters the groove 8 which has been formed in the workpiece 3 by the rotary blade 4. The cooling air flow 27 (designated as "dust lift flow" hereinafter) collides with a flow of cutting chips and dusts (designated as "dust flow 26" hereinafter) to change the traveling direction of the dust flow 26, thereby orienting the dust flow 26 to an opening end of the drain cylinder portion 12. Thus, the cutting chips and dusts are guided within the dust collection cover 1.

At this time, the dust lift flow 27 is ejected from the opening end of the air ejection cylinder portion 24 toward the groove 8 so as to have a component in the cutting direction 6 shown in FIG. 2. The dust lift flow 27 then collides with the dust flow 26 of the cutting chips and dusts to interrupt the dust flow 26 from flowing in the opposite direction to the cutting direction 6. Accordingly, cutting chips and dusts are effectively drawn and collected to the open end of the drain cylinder portion 12 by means of a negative pressure force generated at the opening end of the drain cylinder portion 12 by the dust collector 19. The cutting chips and dusts are then drawn into the dust collection hose 20 and collected in the dust collector 19.

As described above, an efficiency for collecting cutting chips and dusts can be improved due to the dust lift flow 27. Additionally, scattering the cutting chips and dusts to surroundings can be readily prevented. Accordingly, an environment for the cutting operation and a worker of the cutter 2 can be improved. It should be noted that the attachment member 35 does not cover all of the outlet ports 21a formed in the cutter body 21, so that the above structure for ejecting the dust lift flow 27 does not affect cooling performance for the motor.

In this embodiment, the cutting direction 6 is opposite to the dust flowing direction 26, so that the dust collection cover 1 does not need to cover a blade edge of the rotary blade 4 in the cutting direction 6. Accordingly, the worker of cutter 2 can easily watch the blade edge of the rotary blade 4. And, the cutting operation to cut the workpiece 3 along a cutting line thereon can be performed accurately with effective workability.

In this embodiment, the cooling air flow discharged from the cooling fan is employed as a power source for changing the direction of the cutting chips and dusts flow 26. Accordingly, any driving source separated from the motor for driving the rotary blade 4 is not necessary, so that the structure of the cutter 2 can be simplified and the cost of the cutter 2 can be reduced.

Additionally, the dust flow 26 is controlled by the dust lift flow 27 to be oriented to the drain cylinder portion 12 regardless of the width of the groove 8, so that the structure of the cutter 2 can be simplified and the cost of the cutter 2 can be reduced.

In another embodiment, another fan may be provided only to generate an air flow controlling the direction of the dust flow 26. In this case, a driving source for driving the another fan may be the motor for the cutter body 21, an external power source, a battery, a power source for the dust collector 19, or a negative pressure force generated by the dust collector 19.

In the above embodiment, the workpiece 3 is cut by the cutter 2, while pushing the cutter 2 forwards. The above cutting is referred to as a downcut in which the rotary blade 4 cuts the workpiece 3 from above. The cutter 2 is configured to spray the dust lift flow 27 to the workpiece 3 downward from the dust collection cover 1. This structure of the cutter 2 enables another way of cutting the workpiece 3. In other words, the cutter 2 is pulled toward the worker so that the rotary blade 4 cuts the workpiece 3 from below, which is referred to an uppercut. During the uppercut, the dust lift flow 27 removes the cutting chips and dusts deposited on the workpiece 3, so that the worker can easily watch a cutting line on the workpiece 3. As described above, the workability realized by the cutter 2 is improved.

In the above embodiment, the ejection cylinder portion 24 for providing the dust lift flow 27 is formed in the movable cover 11b. In another embodiment, the ejection cylinder portion 24 may be formed separately from the movable cover 11b and fixed integrally therewith.

Figure 9:
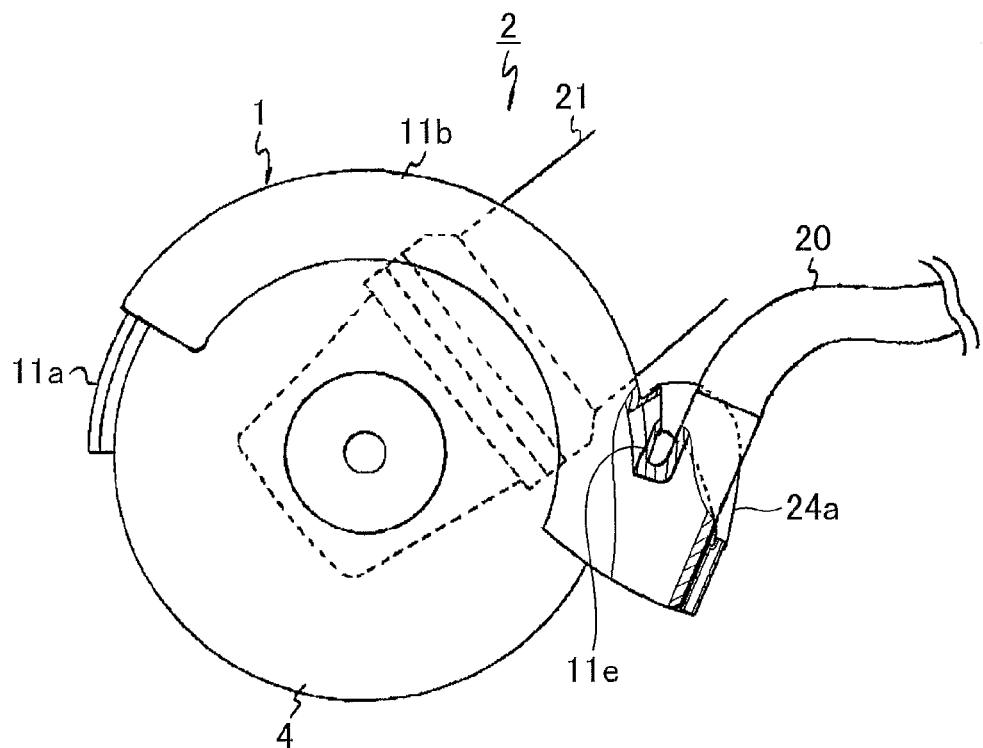
FIG. 9 is a front view of a part of a cutter in which an ejection cylinder portion is in fluid communication with an interior of a dust collection cover.

In another embodiment, an air flow generated by the rotation of the rotary blade 4 can be used to blow the dust lift flow 27 to the workpiece 3. Referring to FIG. 9, an opening 11e is formed in a peripheral portion of the movable cover 11b and then connected to the ejection cylinder portion 24 through a tube 24a. Accordingly, the opening 11e is in fluid communication with the ejection cylinder portion 24. During the cutting operation, the dust lift flow 27 is discharged from the ejection cylinder portion 24 to the workpiece 3 due to the rotation of the rotary blade 4.

Figure 10:
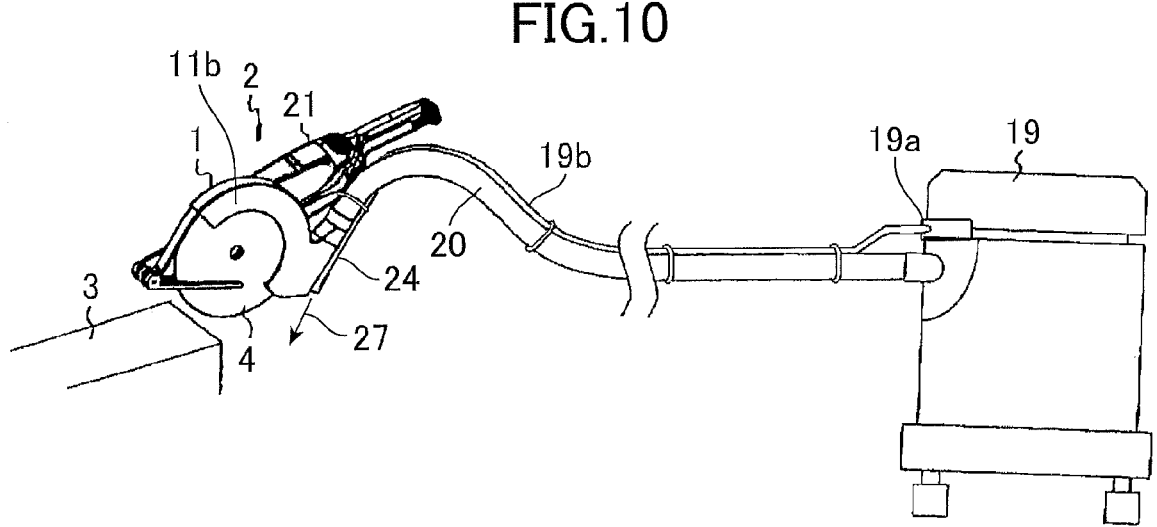
FIG. 10 is a perspective view showing a cutter in which an ejection cylinder portion is in fluid connection with an air-outlet of a dust collector.

In a further embodiment, an air flow discharged from the dust collector 19 can be used to blow the dust lift flow 27 to the workpiece 3. Referring to FIG. 10, an air outlet 19a of the dust collector 19 is in fluid communication with the ejection cylinder portion 24 through an air outlet hose 19a. While the dust collector 19 operates, the dust lift flow 27 is discharged from the ejection cylinder portion 24 to the workpiece 3.

Figure 11:
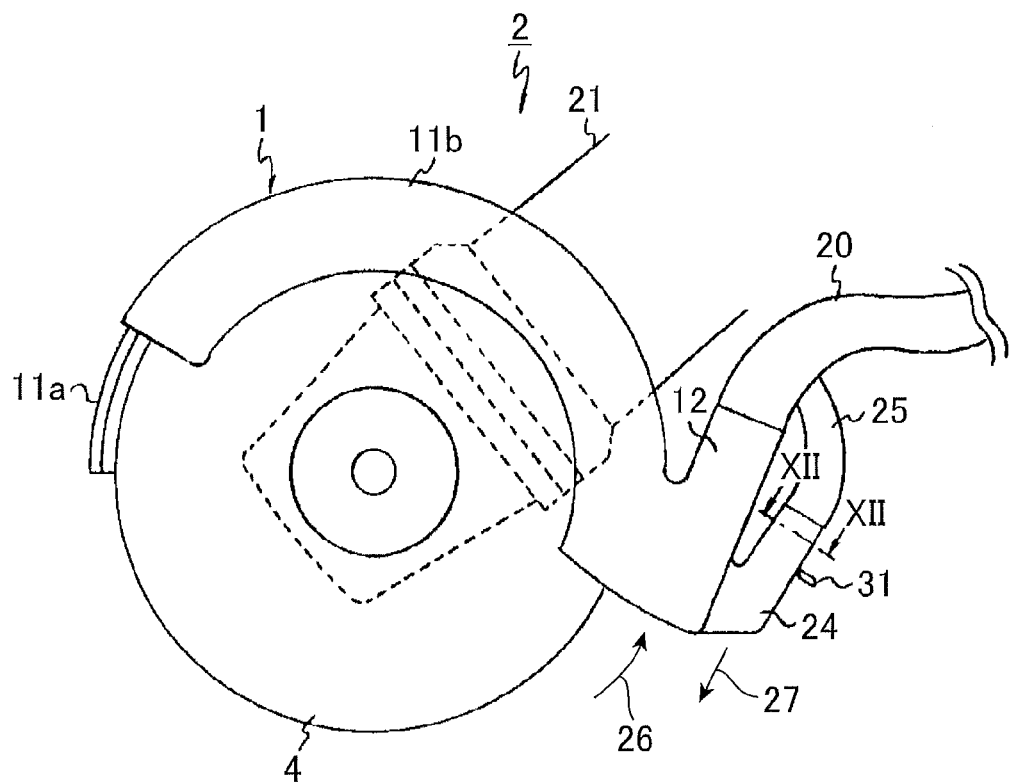
FIG. 11 is a front view of a part of a cutter provided with a dust collection cover according to a second embodiment of the present invention.

A second embodiment according to the present invention will be described with reference to FIGS. 11, 12A, and 12B.

A cutter according to the second embodiment is characterized by controlling the ejection of the cooling air flow from the cooling fan. Referring to FIG. 11, a shielding plate 32 is attached to the ejection cylinder portion 24 so as to open and close the open end of the ejection cylinder portion 24, thereby adjusting a quantity of the dust lift flow 27. The shielding plate 32 is connected to a lever 31 through a shaft 31a to change an angle of the shielding plate 32 by the lever 31.

Figure 12A:
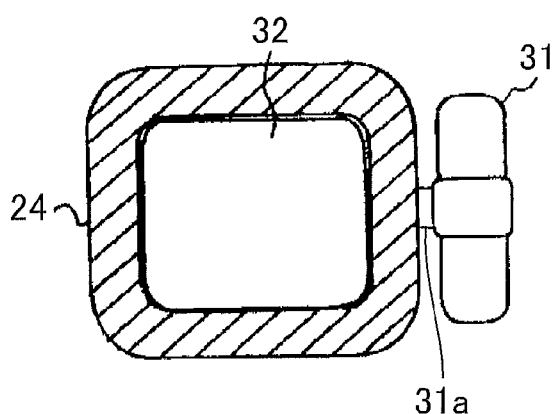
FIG. 12A is a cross-sectional view taken along the line XI-XI of FIG. 11 and showing a closing state of an air ejection sleeve.
Figure 12B:
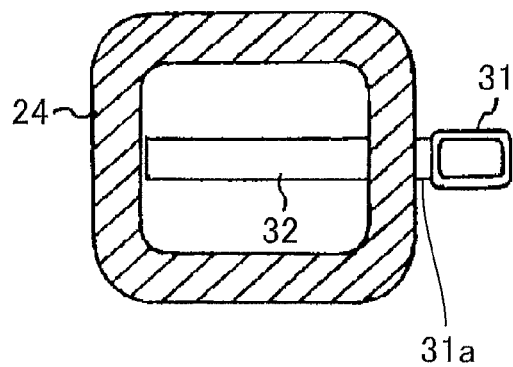
FIG. 12B is a cross-sectional view taken along the line XI-XI of FIG. 11 and showing an opening state of the air ejection sleeve.

During the cutting operation, if there is no need to change the direction of the dust flow 26, the shielding plate 32 completely closes the ejection cylinder portion 24 not to blow the dust lift flow 27 therefrom, as shown in FIG. 12A. If the direction of the dust flow 26 is required to be changed, the shielding plate 32 completely opens the ejection cylinder portion 24 to eject the dust lift flow 27 therefrom, as shown in FIG. 12B. Accordingly, the direction of the dust flow 26 is changed in the same manner as the first embodiment to improve the efficiency to collect cutting chips and dusts.

If the angle of the shielding plate 32 with respect to a longitudinal direction of the ejection cylinder portion 24 is changed, a flow rate of the dust lift flow 27 can be adjusted. It is noted that the shaft 31a is tightly passed through the ejection cylinder portion 24 by an O-ring therebetween. Accordingly, the angle of the shielding plate 32 with respect to the longitudinal direction of the ejection cylinder portion 24 is maintained, when the dust lift flow 27 is flowing.

Figure 13:
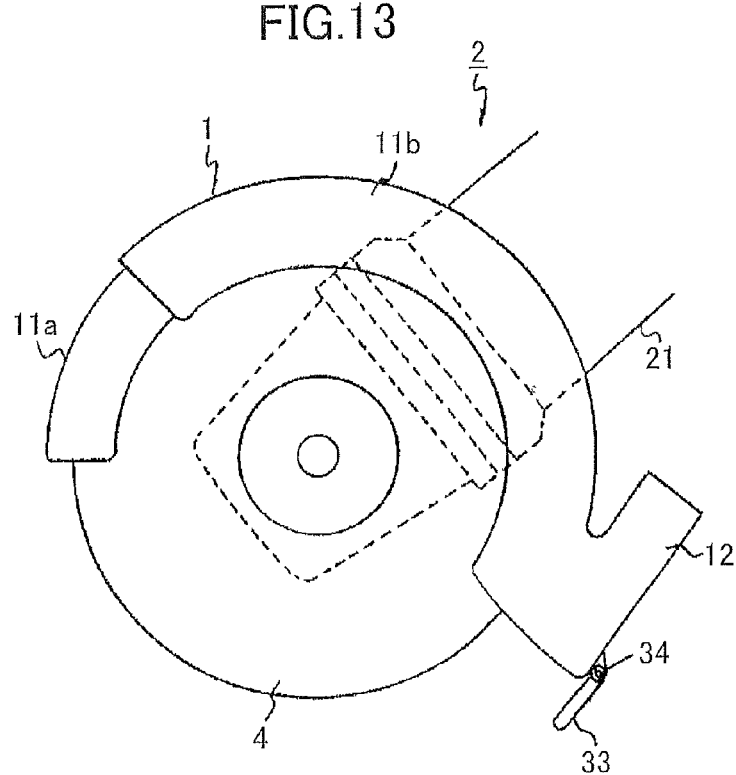
FIG. 13 is a front view of a part of a cutter provided with a dust collection cover according to a third embodiment of the present invention.
Figure 14:
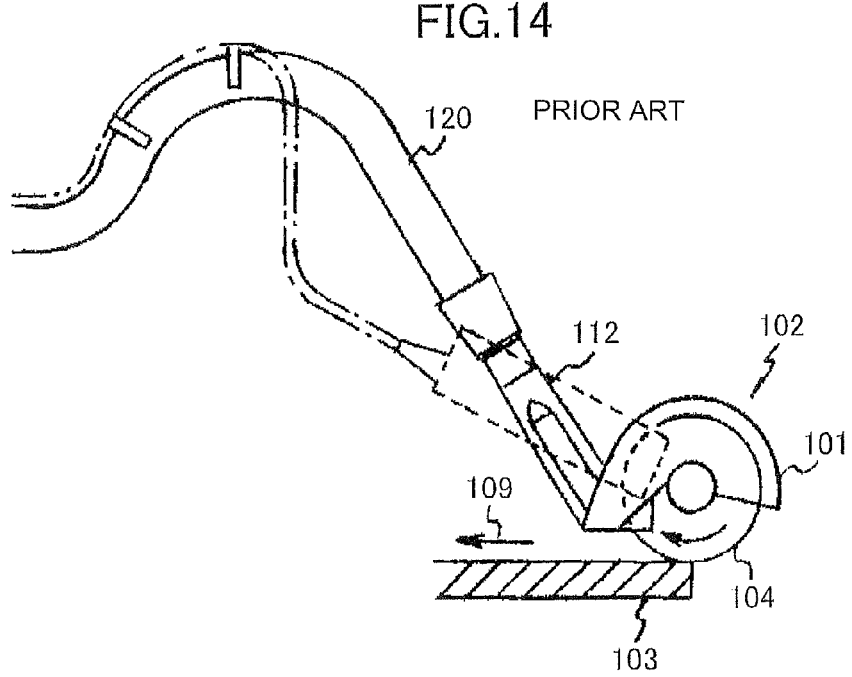
FIG. 14 is a front view of a conventional cutter and showing cutting state thereof.
Figure 15:
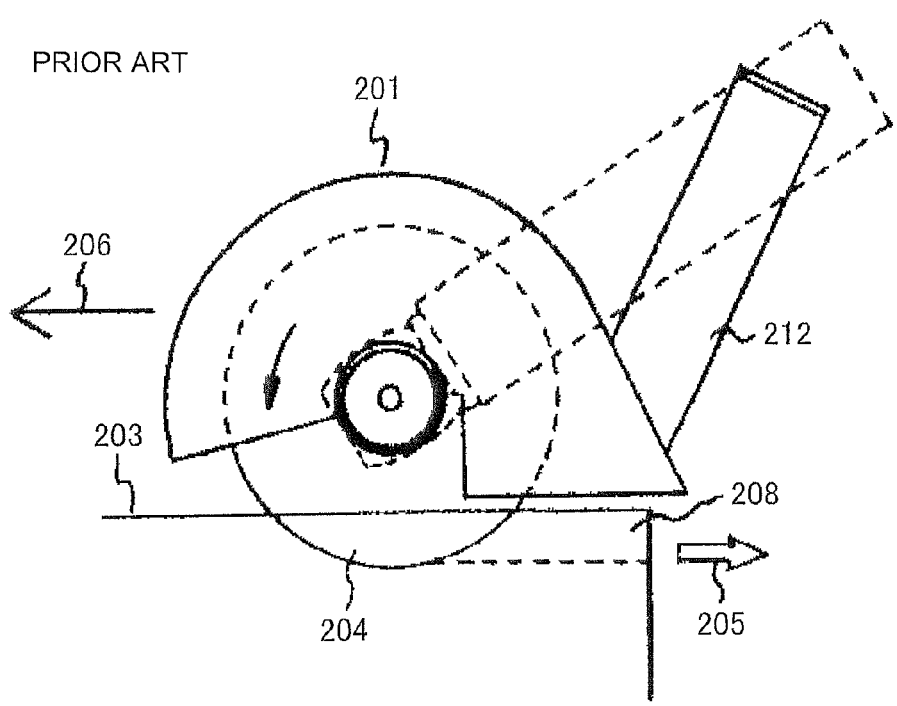
FIG. 15 is a front view of another conventional cutter and showing cutting state thereof.

A cutter according to a third embodiment of the present invention will be described with reference to FIG. 13.

The cutter of this embodiment is characterized by a guiding member 33 which is rotatable about a shaft 34 provided on one end of the movable cover 11b. The shaft 34 extends in a direction substantially perpendicular to the rotating direction of the rotary blade 4. The guiding member 33 has a narrower width than the width of the rotary blade 4, i.e., the width of the groove 8. The guiding member 33 hangs down from the shaft 34 due to a weight of the guiding member 33, as shown in FIG. 13. During the cutting operation, the guiding member 33 enters and moves within the groove together with the movable cover 11b in the workpiece, thereby preventing cutting chips and dusts from flying. Further, the guiding member 33 changes the direction of the dust flow 26 to orient the dust flow 26 to the drain cylinder portion 12. Accordingly, the guiding member 33 guides cutting chips and dusts into the dust collection cover 1.

In another embodiment, the guiding member 33 may be urged, by an elastic mechanism (not shown) toward the opposite direction to the rotating direction of the rotary blade 4, i.e., a counterclockwise direction about the shaft 34. Alternatively, the guiding member 33 can be made from a deformable brush having a narrower width than the width of the rotary blade 4.

Accordingly, the efficiency of collecting cutting chips and dusts is improved, and the workability is improved.

While the invention has been described in detail and with reference to specific embodiments thereof, it would be apparent to those skilled in the art that various changes and modifications may be made therein without departing from the spirit and scope of the invention.

INDUSTRIAL APPLICABILITY

This invention is applicable to cutters including a cutter for cutting a concrete and tile block, and a circular saw for cutting a wooden workpiece.

The invention claimed is:

1. A cutter comprising:
a cutter body accommodating a motor, the cutter body having a plurality of outlet ports for discharging cooling air for cooling the motor accommodated in the cutter body;
a rotary blade adapted to be rotatably driven in a rotation direction by the motor;
a fan for cooling the motor; and
a dust collection cover detachably assembled to the cutter body;
the dust collection cover comprising:
a cover body partially covering the rotary blade and formed with a drain cylinder portion on the trailing side of the rotary blade in the rotation direction of the blade to remove cutting chips and residues generated during a cutting operation, the drain cylinder portion being capable of being detachably connected to a dust collector;
an air ejection cylinder portion provided to the cover body adjacent to and on the trailing side of the drain cylinder portion in the rotation direction of the blade through which a blowing air is directed toward a workpiece for directing the cutting chips and residues toward the drain cylinder portion;
an ejection hose member having one end connected to the air ejection cylinder portion; and
an attachment member covering some of the outlet ports and attached to the other end of the ejection hose member and to the cutter body, wherein
the drain cylinder portion is provided between the rotary blade and the air ejection cylinder portion, and
a part of cooling air generated by the fan is discharged through the some of the outlet ports and the air ejection hose into the air ejection cylinder portion and remaining cooling air is discharged to the atmosphere through other of the outlet ports that are not covered by said attachment member.

2. The cutter as claimed in claim 1, wherein the air ejection cylinder portion is configured to direct the blowing air behind the rotary blade and the drain cylinder portion in a direction with a component opposite to the rotation direction of the blade when the cutter is operated in a down cut manner so that cutting chips and residues in a groove formed in a workpiece are redirected to the drain cylinder portion.

3. The cutter as claimed in claim 1, wherein the air ejection cylinder portion is configured to direct the blowing air behind the rotary blade and the drain cylinder portion in a direction with a component opposite to the rotation direction of the blade when the cutter is operated in a upper cut manner so that cutting chips and residues on a workpiece are directed to the drain cylinder portion.

4. The cutter as claimed in claim 1, wherein the air ejection cylinder portion defines an air blow-out opening, the drain cylinder portion being positioned between the rotary blade and the air blow-out opening in a radial direction of the rotary blade.

5. The cutter as claimed in claim 1, wherein the air ejection cylinder portion is integral with a movable member of the cover body.

6. The cutter as claimed in claim 1, wherein the cover body comprises a stationary cover member fixed to the cutter body and a movable cover member pivotally movably supported to the stationary cover member, the drain cylinder portion being provided at the movable cover member.

7. The cutter as claimed in claim 1, further comprising a base member to be set on a workpiece and pivotally supported to the cover body for adjusting a cutting depth of the workpiece.

8. The cutter as claimed in claim 7, further comprising a roller rotatably supported to the base member.

9. The cutter as claimed in claim 1, wherein some of the outlet ports are covered by the attachment member and the other of the outlet ports are not covered by the attachment member.

10. A dust collection cover detachable to a cutter provided with a cutter body having a plurality of outlet ports, a motor disposed in the cutter body, a rotary blade driven by the motor, a fan for cooling the motor disposed in the cutter body, a cooling air generated by the fan being discharged from the plurality of outlet ports,
the dust collection cover comprising:
a cover body configured to partially cover a rotary blade of a cutter and formed with a drain cylinder portion at one end of the cover body to remove cutting chips and residues generated during a cutting operation, the drain cylinder portion being capable of being detachably connected to a dust collector;

an air ejection cylinder portion provided to the one end of the cover body adjacent to the drain cylinder portion through which a blowing air is directed toward a workpiece for directing the cutting chips and residues toward the drain cylinder portion;

an ejection hose member having one end connected to the air ejection cylinder portion; and an attachment member covering some of the outlet ports and attached to the other end of the ejection hose member and adapted to be attached to a cutter body so as to cover some of cooling air outlet ports of the cutter body, wherein the drain cylinder portion is provided between the rotary blade and the air ejection cylinder portion, and a part of cooling air generated by the fan is discharged through the some of the outlet ports and the air ejection hose into the air ejection cylinder portion and remaining cooling air is discharged to the atmosphere through other of the outlet ports that are not covered by said attachment member.

* * * * *